US010272756B2

United States Patent
Sia, Jr. et al.

(10) Patent No.: US 10,272,756 B2
(45) Date of Patent: Apr. 30, 2019

(54) VEHICLE DOOR ASSEMBLY, AND METHODS OF USE AND MANUFACTURE THEREOF

(71) Applicant: Honda Motor Co., Ltd., Tokyo (JP)

(72) Inventors: Generoso Tan Sia, Jr., Plain City, OH (US); Jason Dilley, Plain City, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 457 days.

(21) Appl. No.: 15/067,122

(22) Filed: Mar. 10, 2016

(65) Prior Publication Data

US 2017/0259656 A1 Sep. 14, 2017

(51) Int. Cl.
*B60J 10/00* (2016.01)
*E06B 7/23* (2006.01)
(Continued)

(52) U.S. Cl.
CPC ............... *B60J 10/45* (2016.02); *B60J 10/26* (2016.02); *B60J 10/32* (2016.02); *B60J 10/84* (2016.02); *E06B 7/2305* (2013.01); *E06B 7/28* (2013.01)

(58) Field of Classification Search
CPC ... B60J 10/45; B60J 10/26; B60J 10/36; B60J 10/33; B60J 10/84; B60J 10/32; B60J 10/40; B60J 10/70; B60J 10/76; B60J 10/75; B60J 10/74; B60J 10/77; B60J 10/79; B60J 1/2013; B60J 1/2063; B60J 1/2066
(Continued)

(56) References Cited

U.S. PATENT DOCUMENTS

| 3,797,857 A | 3/1974 | Reeves |
| 4,956,943 A | 9/1990 | Yamada et al. |

(Continued)

FOREIGN PATENT DOCUMENTS

| DE | 10010026 A1 * | 9/2001 | ............ B60J 1/2038 |
| EP | 0245594 A2 | 11/1987 | |

(Continued)

OTHER PUBLICATIONS

Jeuffray, English Translation of "EP 0985567" Obtained from <https://worldwide.espacenet.com/>. (Year: 2000).*

(Continued)

*Primary Examiner* — Katherine W Mitchell
*Assistant Examiner* — Johnnie A. Schablack
(74) *Attorney, Agent, or Firm* — Kenealy Vaidya LLP

(57) ABSTRACT

Some embodiments are directed to a weatherstrip and garnish assembly for use with a vehicle door that includes a body flange. The weatherstrip and garnish assembly can include a weatherstrip assembly that has a weatherstrip configured to be secured to the body flange of the vehicle door. The weatherstrip can include a curved portion. A sunshade garnish can be spaced from the curved portion of the weatherstrip to define a gap therebetween. A weatherstrip garnish can be disposed between the sunshade garnish and the weatherstrip so as to cover the gap. A first connector can connect the sunshade garnish to the weatherstrip garnish. A second connector can connect the weatherstrip garnish to the weatherstrip assembly.

20 Claims, 8 Drawing Sheets

(51) Int. Cl.
*E06B 7/28* (2006.01)
*B60J 10/26* (2016.01)
*B60J 10/32* (2016.01)
*B60J 10/84* (2016.01)

(58) Field of Classification Search
USPC .................................................. 160/370.22
See application file for complete search history.

(56) References Cited

U.S. PATENT DOCUMENTS

| | | | |
|---|---|---|---|
| 5,089,912 A * | 2/1992 | Simin | B60J 1/2041 |
| | | | 160/370.22 |
| 5,111,619 A * | 5/1992 | Billin | B60R 13/0206 |
| | | | 24/297 |
| 5,137,072 A * | 8/1992 | Traspadini | B60J 1/2038 |
| | | | 160/26 |
| 5,605,370 A * | 2/1997 | Ruiz | B60J 1/2047 |
| | | | 160/370.22 |
| 5,743,047 A | 4/1998 | Bonne et al. | |
| 5,775,030 A * | 7/1998 | Hamabata | B60J 10/75 |
| | | | 49/377 |
| 6,070,363 A | 6/2000 | Vance | |
| 6,119,406 A | 9/2000 | Gulisano et al. | |
| 6,123,385 A * | 9/2000 | Bailey | B60J 5/0416 |
| | | | 296/146.7 |
| 6,282,840 B1 * | 9/2001 | Vance | B60J 10/265 |
| | | | 49/377 |
| 6,321,490 B1 | 11/2001 | Vance | |
| 6,347,825 B2 * | 2/2002 | Seel | B60J 1/2027 |
| | | | 160/370.22 |
| 6,416,113 B1 | 7/2002 | Page | |
| 6,446,392 B1 * | 9/2002 | Maki | B60J 10/265 |
| | | | 49/377 |
| 6,742,304 B1 | 6/2004 | Mueller et al. | |
| 6,837,005 B2 * | 1/2005 | Arata | B60J 10/16 |
| | | | 296/146.9 |
| 6,955,392 B2 | 10/2005 | Dry | |
| 6,966,601 B2 * | 11/2005 | Matsumoto | B60R 13/0206 |
| | | | 296/146.2 |
| 7,014,243 B2 * | 3/2006 | Nakajo | B60J 1/2019 |
| | | | 160/370.22 |
| 7,055,291 B2 | 6/2006 | Nakanishi et al. | |
| 7,108,313 B2 | 9/2006 | Forrester et al. | |
| 7,159,926 B2 * | 1/2007 | Ward | B60R 13/0206 |
| | | | 296/1.08 |
| 7,210,730 B2 * | 5/2007 | Fujita | B60R 13/04 |
| | | | 296/146.5 |
| 7,344,181 B2 | 3/2008 | Koshimichi | |
| 7,384,063 B2 * | 6/2008 | Riester | B60R 21/21 |
| | | | 280/728.2 |
| 7,401,840 B2 * | 7/2008 | Schnoblen | B60J 1/2044 |
| | | | 160/370.22 |
| 7,475,935 B2 * | 1/2009 | Ercolano | B60J 1/2038 |
| | | | 296/146.7 |
| 7,490,851 B2 * | 2/2009 | Riester | B60R 13/02 |
| | | | 280/730.2 |
| 7,536,830 B2 * | 5/2009 | Clark | B60J 10/32 |
| | | | 296/146.7 |
| 7,784,824 B2 * | 8/2010 | Sato | B60R 21/21 |
| | | | 280/728.2 |
| 7,806,462 B2 | 10/2010 | Horneck | |
| 8,070,204 B2 | 12/2011 | Mourou | |
| 8,141,935 B2 | 3/2012 | Thota et al. | |
| 8,317,248 B2 | 11/2012 | Lange et al. | |
| 8,424,903 B2 * | 4/2013 | Kaneda | B60R 13/02 |
| | | | 280/728.3 |
| 8,534,744 B2 | 9/2013 | Turicik et al. | |
| 8,549,790 B2 * | 10/2013 | Murree | B60J 10/75 |
| | | | 49/377 |
| 8,663,535 B2 * | 3/2014 | Larcom | B60R 13/0243 |
| | | | 264/319 |
| 8,801,070 B2 | 8/2014 | Takeuchi et al. | |
| 8,840,170 B2 | 9/2014 | Zimmer et al. | |
| 8,919,846 B2 * | 12/2014 | Maass | B60J 10/042 |
| | | | 296/1.08 |
| 9,003,711 B2 * | 4/2015 | Priess | B60J 10/246 |
| | | | 49/490.1 |
| 9,027,982 B2 * | 5/2015 | Ide | B60J 5/0402 |
| | | | 296/146.2 |
| 9,114,693 B2 * | 8/2015 | Prater | B60J 10/0091 |
| 9,132,717 B2 * | 9/2015 | Usami | B60J 1/2063 |
| 9,434,242 B2 * | 9/2016 | Yamada | B60J 10/75 |
| 9,452,663 B2 * | 9/2016 | Watanabe | B60J 1/2038 |
| 9,481,322 B2 * | 11/2016 | Jeon | B60R 13/0243 |
| 9,840,208 B2 * | 12/2017 | Choi | B60J 5/0405 |
| 9,863,454 B2 * | 1/2018 | Morris | F16B 17/00 |
| 9,937,778 B2 * | 4/2018 | Walawender | B60J 10/74 |
| 10,118,651 B2 * | 11/2018 | Dureiko | B62D 27/023 |
| 2004/0036234 A1 * | 2/2004 | Plottnik | B60J 10/24 |
| | | | 277/642 |
| 2004/0094989 A1 * | 5/2004 | Matsumoto | B60R 13/0206 |
| | | | 296/146.1 |
| 2004/0155441 A1 * | 8/2004 | Hofmann | B60R 21/21 |
| | | | 280/730.2 |
| 2005/0040629 A1 * | 2/2005 | Chausset | B60R 21/21 |
| | | | 280/730.2 |
| 2006/0079167 A1 * | 4/2006 | Krause | B60J 10/24 |
| | | | 454/121 |
| 2006/0082192 A1 * | 4/2006 | Dubay | B60J 1/2011 |
| | | | 296/214 |
| 2007/0046000 A1 * | 3/2007 | Sato | B60R 13/0243 |
| | | | 280/730.2 |
| 2007/0068638 A1 * | 3/2007 | Puskarz | B60J 1/2047 |
| | | | 160/370.22 |
| 2009/0205792 A1 * | 8/2009 | Brendel | B60J 1/2044 |
| | | | 160/370.22 |
| 2011/0215612 A1 * | 9/2011 | Maertin | B60R 13/0243 |
| | | | 296/146.7 |
| 2012/0085029 A1 * | 4/2012 | Stockschlager | B60J 10/00 |
| | | | 49/31 |
| 2013/0031842 A1 * | 2/2013 | Murree | B60J 10/30 |
| | | | 49/492.1 |
| 2013/0320705 A1 * | 12/2013 | Okada | B60R 13/0243 |
| | | | 296/146.2 |
| 2014/0117704 A1 * | 5/2014 | Ide | B60J 5/0402 |
| | | | 296/146.2 |
| 2014/0346799 A1 | 11/2014 | Balla et al. | |
| 2016/0137037 A1 * | 5/2016 | Watanabe | B60J 1/2038 |
| | | | 160/370.22 |
| 2017/0158032 A1 * | 6/2017 | Yun | B60J 1/2086 |
| 2017/0225552 A1 * | 8/2017 | Masumoto | B60J 10/22 |
| 2017/0232827 A1 * | 8/2017 | Ogawa | B60J 10/75 |
| | | | 49/495.1 |
| 2017/0246939 A1 * | 8/2017 | Dosaki | B60J 10/27 |
| 2017/0260788 A1 * | 9/2017 | Takahashi | B60J 10/76 |

FOREIGN PATENT DOCUMENTS

| | | | | |
|---|---|---|---|---|
| EP | 0882609 A1 * | 12/1998 | ............ | B60J 1/2011 |
| EP | 0985567 A1 * | 3/2000 | ............ | B60J 1/2038 |
| FR | 2764244 A1 * | 12/1998 | ............ | B60J 1/2011 |
| FR | 2774947 A1 * | 8/1999 | ............ | B60J 1/2011 |
| FR | 2774947 B1 * | 4/2000 | ............ | B60J 1/2011 |
| FR | 2792257 A1 * | 10/2000 | ............ | B60J 1/2038 |
| FR | 2830798 A1 * | 4/2003 | ............ | B60J 1/2038 |
| FR | 2879132 A1 * | 6/2006 | ............ | B60J 1/2044 |
| JP | 2008195267 A * | 8/2008 | | |
| KR | 100725915 B1 * | 5/2007 | | |
| KR | 20150026128 A * | 3/2015 | | |
| WO | WO-2014088022 A1 * | 6/2014 | ............ | B60J 1/2038 |

OTHER PUBLICATIONS

Jeuffray, English translation of "FR 2830798" obtained from <http://ep.espacenet.com/> (Year: 2003).*

* cited by examiner

VEHICLE DOOR ASSEMBLY, AND METHODS OF USE AND MANUFACTURE THEREOF

BACKGROUND

The disclosed subject matter relates to a vehicle door assembly, and methods of use and manufacture thereof. More particularly, the disclosed subject matter relates to methods and apparatus for attaching garnishes and trim panels to a vehicle door assembly.

A vehicle can include one or more door assemblies that can permit ingress/egress to/from a vehicle interior or storage area. Some vehicle door assemblies can include a windowpane that can be fixed in place or movable between open and closed positions. These door assemblies can include a door sash that surrounds the window, or they can be sash-less. The door assemblies can include aesthetically enhanced panels and garnishes that are connected to the inner door panel. These panels can be formed from plastic, metal, leather, wood, etc., or any combination thereof. The door assemblies can include an exterior styling feature that defines a boundary between the bottom of the closed windowpane and the exterior door panel. The top of the door lining typically follows this styling feature so that the door lining does not extend into an area that is exposed by or covered by the windowpane.

SUMMARY

However, the related art door assemblies are subject to various disadvantages. For example, the exterior styling options for the vehicle can be limited by the layout of the door assembly relative to the wheel wells. The wheel well can create a packaging constraint that can affect the size and shape of the windowpane, and a constraint affecting the length of the windowpane that is able to be lowered into the door.

It may therefore be beneficial to provide a door panel assembly that addresses at least one of the above and/or other disadvantages of the related art. In particular, it may be beneficial to style the interior area around one or more of the windows so that it provides lines or cues that are not identical to those of the exterior styling of the area around the one or more of the windows. For example, it may be beneficial to utilize a door assembly that includes a door sash that extends across and behind a portion of the windowpane when the windowpane is in a closed or partially opened position. In another example, it may be beneficial to provide a door lining that has an upper surface that diverts from the border between the bottom of the windowpane and the exterior door panel so that a portion of the door lining extends across and behind the windowpane.

Some embodiments are therefore directed to a weatherstrip and garnish assembly for use with a vehicle door that includes a body flange. The weatherstrip and garnish assembly can include a weatherstrip assembly that has a weatherstrip configured to be secured to the body flange of the vehicle door. The weatherstrip can include a curved portion. A sunshade garnish can be spaced from the curved portion of the weatherstrip to define a gap therebetween. A weatherstrip garnish can be disposed between the sunshade garnish and the weatherstrip so as to cover the gap. A first connector can connect the sunshade garnish to the weatherstrip garnish. A second connector can connect the weatherstrip garnish to the weatherstrip assembly.

Some other embodiments are directed to a vehicle door that includes an inner door panel having a body flange; an outer door panel connected to the inner door panel; and a weatherstrip and garnish assembly. The weatherstrip and garnish assembly can include a weatherstrip assembly that has a weatherstrip configured to be secured to the body flange of the vehicle door. The weatherstrip can include a curved portion. A sunshade garnish can be spaced from the curved portion of the weatherstrip to define a gap therebetween. A weatherstrip garnish can be disposed between the sunshade garnish and the weatherstrip so as to cover the gap. A first connector can connect the sunshade garnish to the weatherstrip garnish. A second connector can connect the weatherstrip garnish to the weatherstrip assembly.

Still other embodiments are directed to a method of manufacturing a weatherstrip and garnish assembly for use with a vehicle door that includes a body flange. The method can include: configuring a weatherstrip assembly to include a weatherstrip that defines a curved portion; securing the weatherstrip to the body flange of the vehicle door; spacing a sunshade garnish from the curved portion of the weatherstrip to define a gap therebetween; disposing a weatherstrip garnish between the sunshade garnish and the weatherstrip so as to cover the gap; connecting the sunshade garnish to the weatherstrip garnish with a first connector; and connecting the weatherstrip garnish to the weatherstrip assembly with a second connector.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which.

DETAILED DESCRIPTION OF EXEMPLARY EMBODIMENTS

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows.

I. Door Assembly

Figure 1:
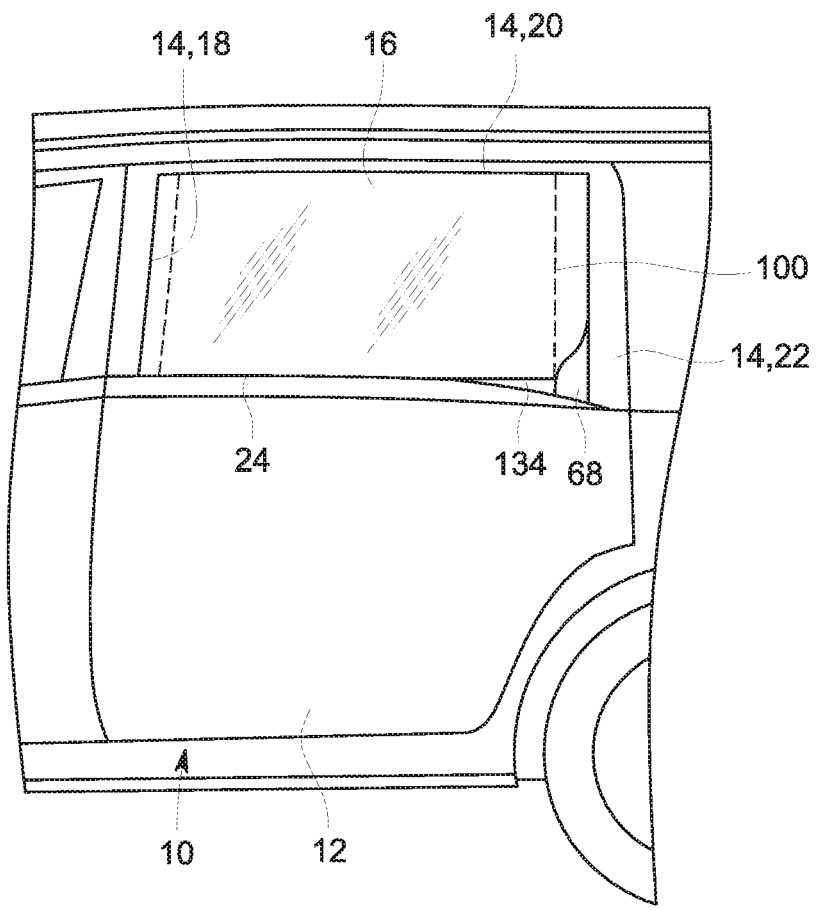
FIG. 1 is a side view of an exterior side of a door assembly for a vehicle in accordance with the disclosed subject matter.

FIG. 1 illustrates an embodiment of a door assembly 10 for a vehicle made in accordance with the principles of the disclosed subject matter. The door assembly 10 can be configured as a front-hinged door, a rear-hinged door, a sliding door, a top-hinged door, or a bottom-hinged door.

The door assembly 10 can include an outer door panel 12, a door sash 14 and a windowpane 16. The door assembly 10 can include a lower portion and an upper portion. The outer door panel 12 can extend along a lower portion of the door assembly 10. The door sash 14 can extend along the upper portion of the door assembly 10.

The lower portion of the door assembly 10 can include a hinge assembly, a latch assembly for securing the door in a closed portion, inner and outer door handles for releasing the latch assembly and facilitating movement of the door assembly by a user of the vehicle, a door lock assembly, and a window regulator assembly for raising and lowering the windowpane 16. Exemplary embodiments are intended to include more or less of these components, systems and assemblies included with the door assembly 10. For example, at least a portion of a power assembly for opening and/or closing the door assembly 10 can be mounted to the lower portion of the door. In another example, the inner door handle and/or the outer door handle can be mounted in or on the door sash 14, instead of on the lower portion of the door assembly 10.

The door sash 14 can include a front portion 18, a top portion 20, and a rear portion 22. The front and rear portions 18, 22 can extend away from the lower portion of the door assembly 10. The top portion 20 can extend from the front portion 18 to the rear portion 22. Exemplary embodiments are intended to include an inner and/or an outer door handle mounted on, or to, the sash 14 instead of being mounted to the lower portion of the door assembly 10.

Figure 2:
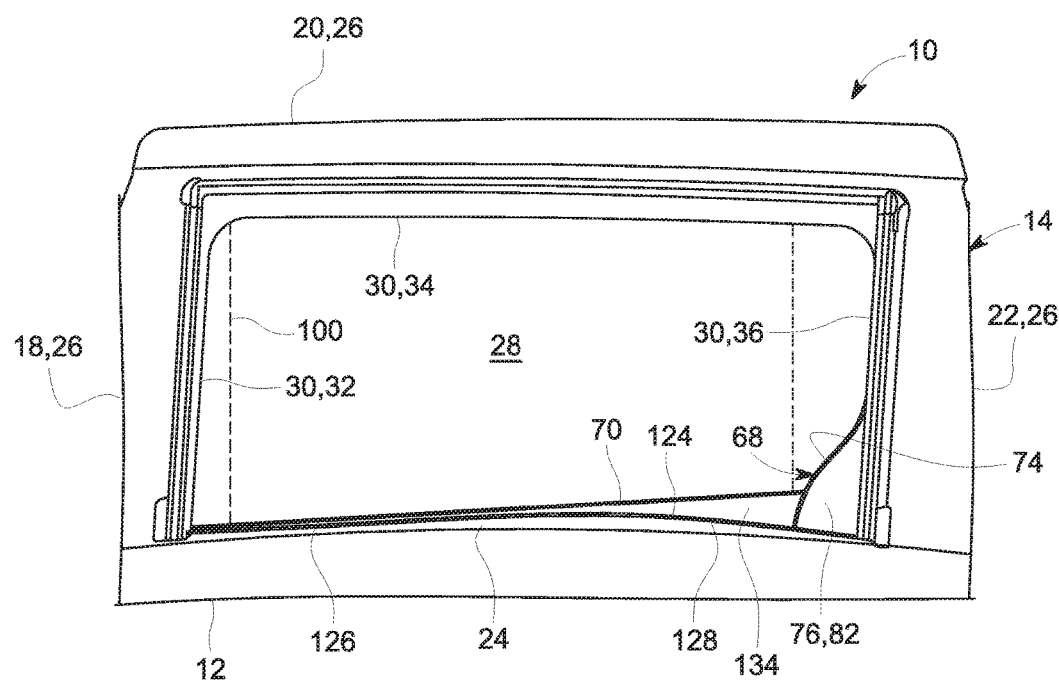
FIG. 2 is an enlarged view of a portion of the door assembly of FIG. 1.

Referring to FIGS. 1 and 2, the sash 14 can cooperate with an upper edge 24 of the door assembly 10 to provide a frame that surrounds an opening 28 in the door assembly 10 for the windowpane 16. The sash 14 can be configured to hold the windowpane 16 in a fixed position, or to permit and guide the windowpane 16 as it moves between a closed position and an opened position. The windowpane 16 is omitted from FIGS. 2-10 for simplicity and clarity of the drawings.

FIG. 2 shows the exterior of the upper portion of the door assembly 10 and a portion of the outer door panel 12. The outer door panel 12 can include an outer sash portion 26 that forms the outer surface of the door sash 14. The outer sash portion 26 can be integrally formed as a single piece with the outer door panel 12. Exemplary embodiments are intended to include the outer door panel 12 integrated with the outer sash portion 26 by stamping the panel 12 and the outer sash portion 26 from a single piece of sheet metal, such as but not limited to steel or aluminum, or by molding as a single piece from any appropriate material such as but not limited to plastic, fiberglass, carbon fiber, fiber-reinforced plastic, or any combination thereof. Exemplary embodiments also are intended to include an outer sash portion 26 that is formed separately from the outer door panel 12 and connected to the outer door panel 12 in any appropriate manner. Such a separately formed outer sash portion 26 can be formed from any appropriate material listed above for an integrally formed outer door panel 12 and outer sash portion 26.

Figure 3:
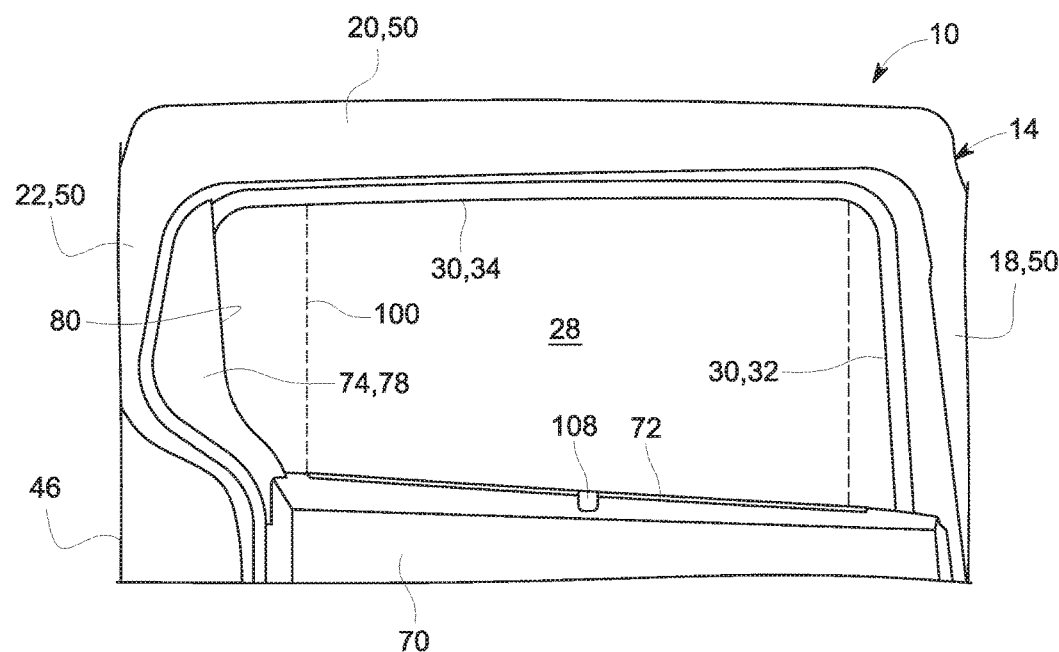
FIG. 3 is side view of a portion of an interior side of the door assembly of FIG. 1.
Figure 4:
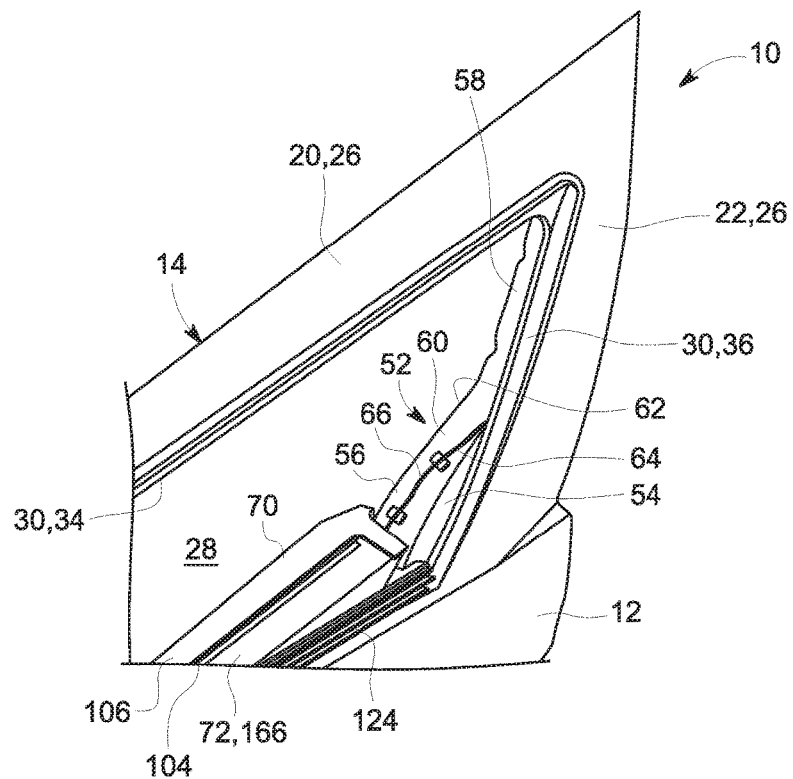
FIG. 4 is perspective view of a rear portion of the door assembly of FIG. 1 in a partially assembled state.
Figure 5:
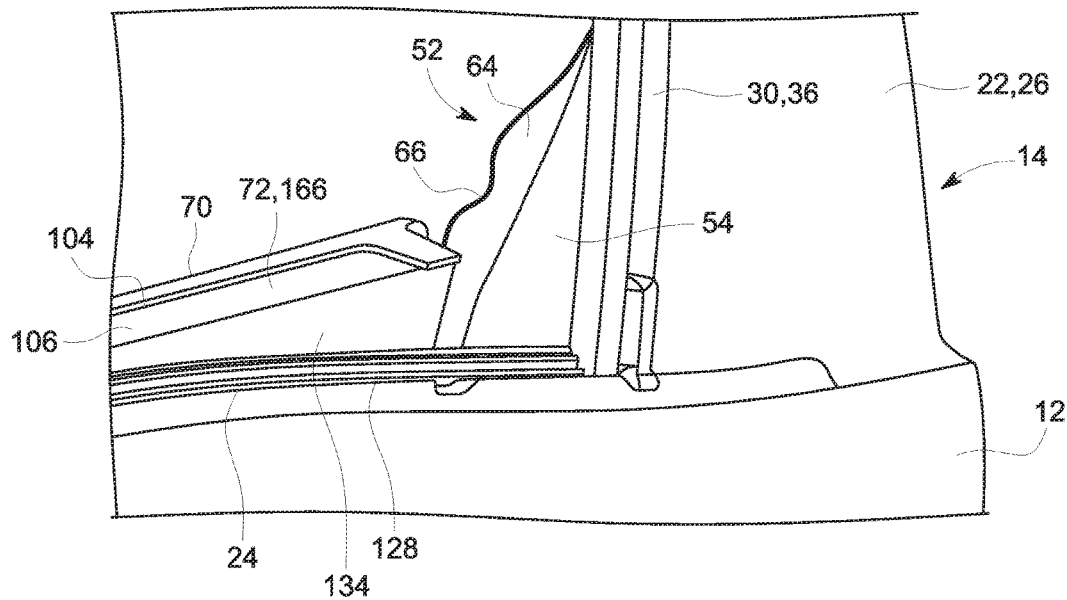
FIG. 5 is another perspective view of the rear portion of the door assembly of FIG. 1 in a partially assembled state.

In exemplary embodiments in which the windowpane 16 is movable between a closed position and an opened position, the door assembly 10 can include a run channel 30. As shown in FIGS. 2 and 3, the run channel 30 can extend along the inner perimeter of the door sash 14 to partially surround the window opening 28. The run channel 30 can include a front portion 32, a top portion 34 and a rear portion 36 that are connected to the front portion 18, top portion 20 and rear portion 22 of the door sash 14, respectively.

Figure 7:
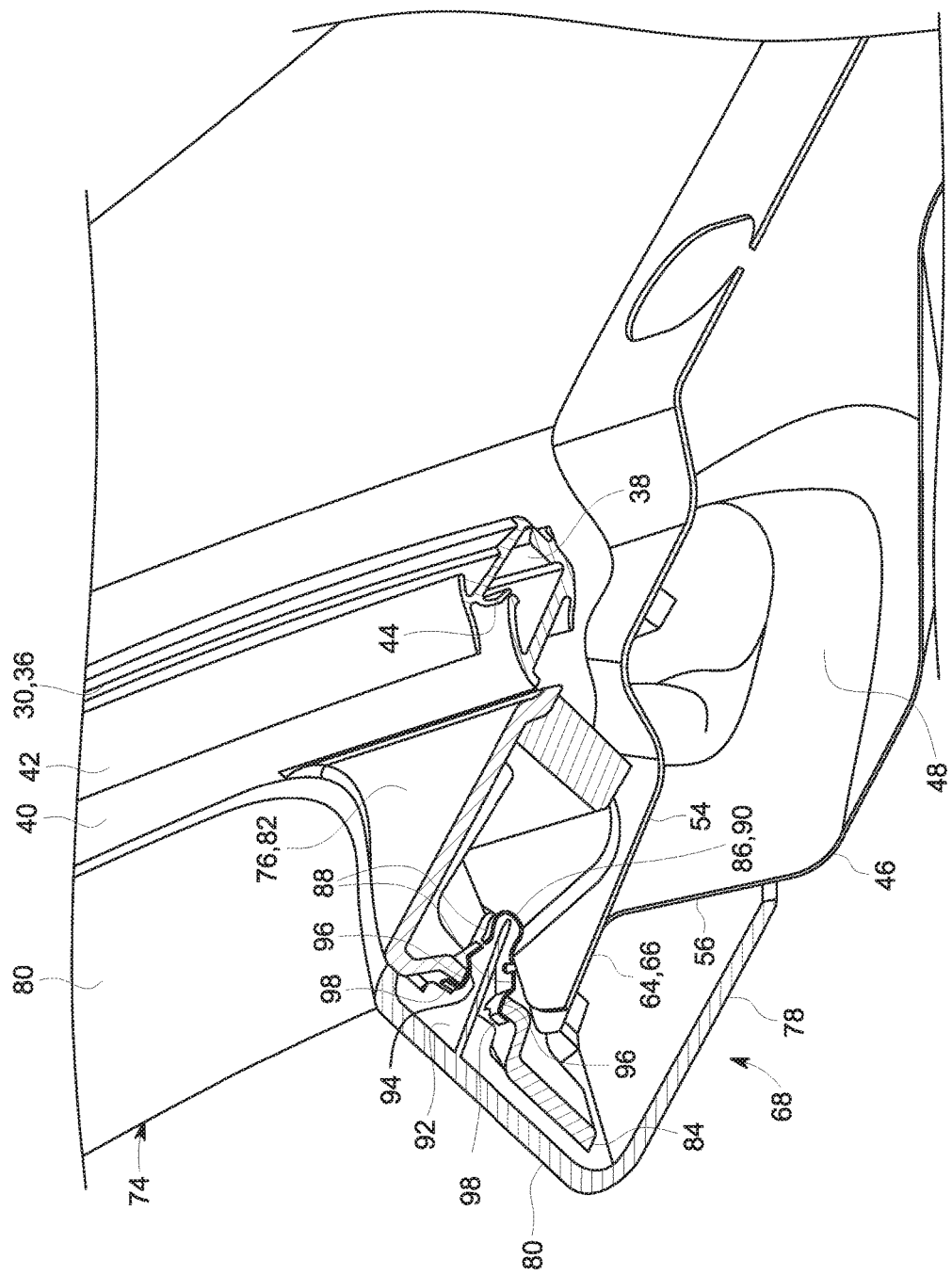
FIG. 7 is a perspective view of a portion of the door assembly of FIG. 1 including a cross-sectional view taken along 7-7 of FIG. 6.

Referring to FIG. 7, the run channel 30 can include a pathway 38 for the windowpane 16 as the windowpane 16 moves between the closed and opened positions. The run channel 30 can include a plurality of wiper seals 40, 42, 44 that engage the windowpane 16. The run channel 30 can be connected to the door sash 14 in any appropriate manner such as but not limited to threaded fasteners, clips, friction fitting or any combination thereof.

In exemplary embodiments in which the windowpane 16 is fixed to the door assembly 10 to provide a stationary window, the run channel 30 can be omitted. In such exemplary embodiments, a molding assembly can be connected to the outer perimeter of the windowpane 16. The fixed windowpane 16 can be secured to the sash 14 and the lower portion of the door assembly 10 in any appropriate manner such as but not limited to threaded fasteners, clips, hook and loop fasteners, adhesive bonding or any combination thereof.

Figure 8:
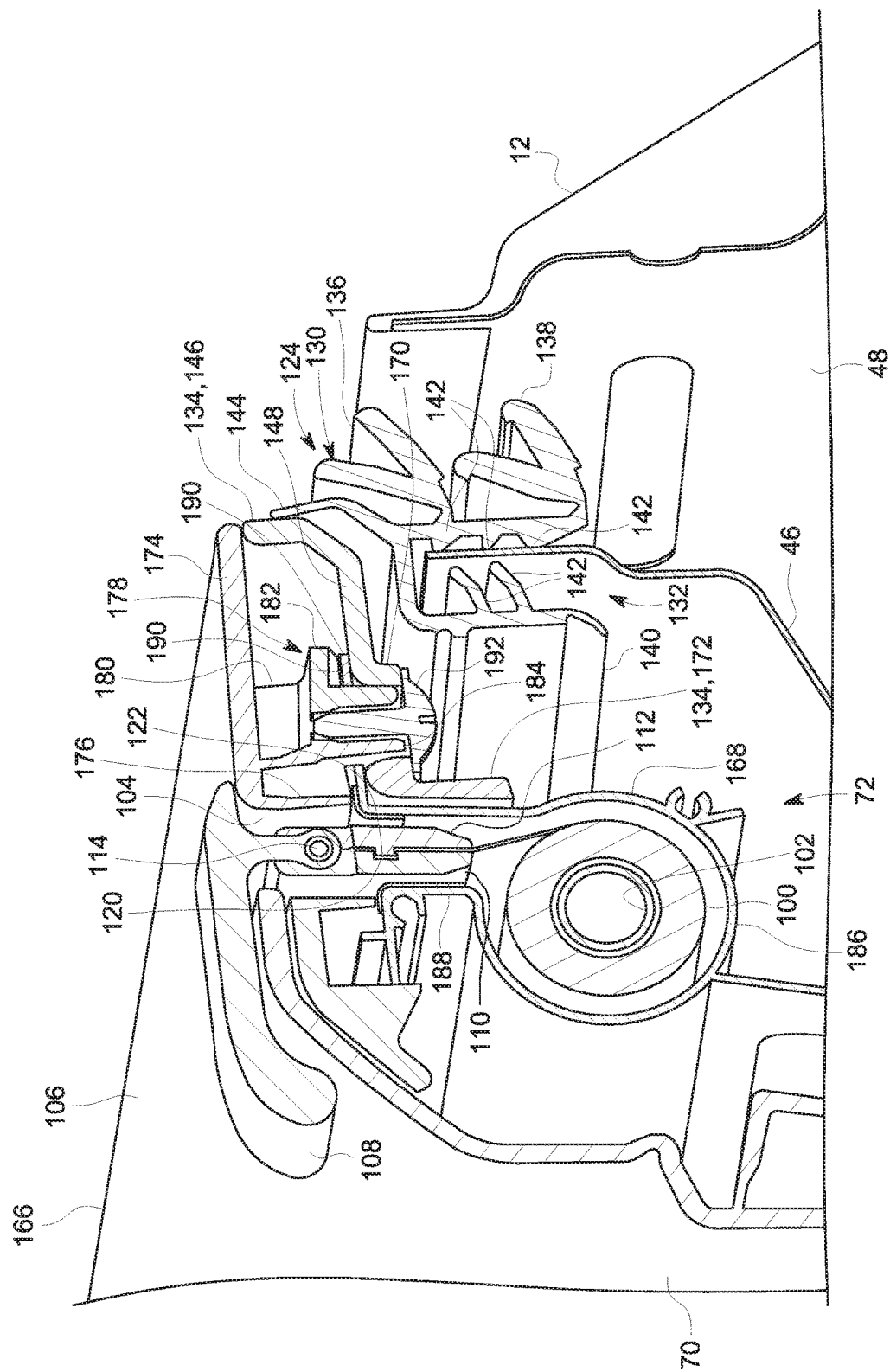
FIG. 8 is a cross-sectional view taken along 8-8 of FIG. 6 and shown as a perspective view.
Figure 9:
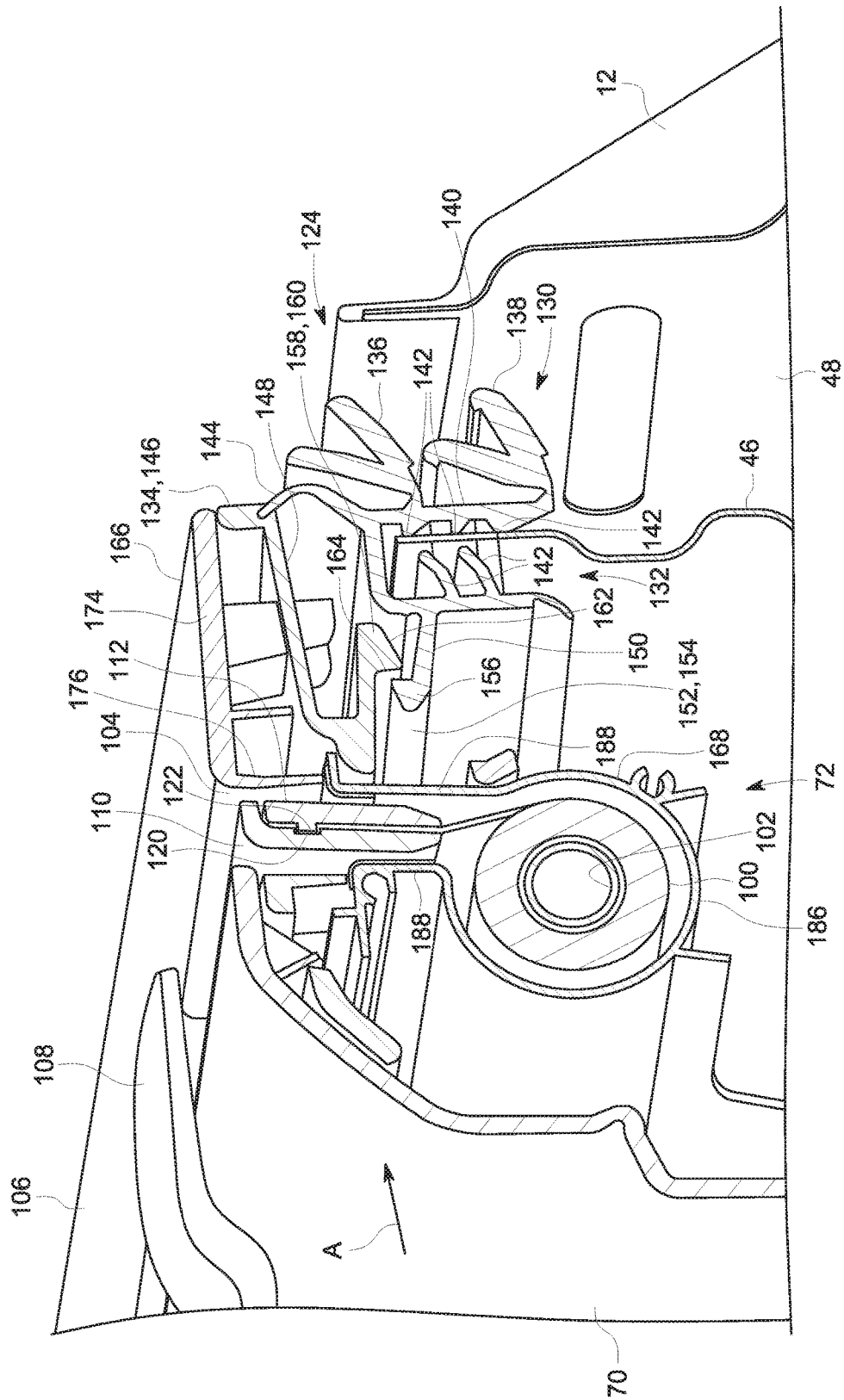
FIG. 9 is a cross-sectional view taken along 9-9 of FIG. 6.

Referring to FIG. 3, the door assembly 10 can include an inner door panel 46. FIG. 3 shows the interior side of the upper portion of the door assembly 10 and the interior side of a portion of the inner door panel 46. The inner door panel 46 can extend along the lower portion of the door assembly 10. The inner door panel 46 can span the area of the outer door panel 12. The inner door panel 46 can be connected to the outer door panel 12 in any appropriate manner, such as but not limited to welding, adhesive bonding, self-piercing fasteners such as but not limited to screws or rivets, or any combination thereof. The outer and inner door panels 12, 46 can define a closed cavity therein for containing one or more of the components, systems and assemblies of the door assembly 10 listed above. FIGS. 7-9 show a portion of the closed cavity 48.

The inner door panel 46 can include an inner sash portion 50. The inner sash portion 50 can be integrally formed as a single piece with the inner door panel 46. Exemplary embodiments are intended to include the inner door panel 46 integrated with inner sash portion 50 by stamping the panel 46 and the portion 50 from a single piece of sheet metal, such as but not limited to steel or aluminum, or molded as a single piece from any appropriate material such as but not limited to plastic, fiberglass, carbon fiber, fiber-reinforced plastic, or any combination thereof. Exemplary embodiments also are intended to include an inner sash portion 50 that is formed separately from the inner door panel 46 and connected to the inner door panel 46 in any appropriate manner. Such a separately formed inner sash portion can be formed from any appropriate material listed above for an integrally formed inner door panel 46 and inner sash portion Referring to FIGS. 4 and 5, the rear portion 22 of the door sash 14 can include a lower portion 52 that projects toward the front portion 18 of the door sash 14 so that the lower portion 52 can extend beyond the rear portion 36 of the run channel 30. The lower portion 52 (and the covering garnishes) can extend across and behind the windowpane 16, as shown in FIG. 1. The lower portion 52 can abut the upper edge 24 of the lower portion of the door assembly 10. The lower portion 52 can be generally triangular in shape. The lower portion 52 can extend up from the upper edge 24 of the lower portion of the door assembly 10 and toward the top portion 20 of the door sash 14. The lower portion 52 can terminate at a location on the rear portion 22 of the door sash 14 that is intermediate the upper edge 24 and the top portion 20 of the door sash 14. The lower portion 52 can be formed from an outer panel portion 54 of the outer door panel 12 and an inner panel portion 56 of the inner door panel 46.

The outer panel portion 54 can abut the upper edge 24 of the lower portion of the door assembly 10. The outer panel portion 54 can be generally triangular in shape.

The inner panel portion 56 can abut the upper edge 24 of the lower portion of the door assembly 10. The inner panel portion 56 can span the area of the lower portion 52. The inner panel portion 56 can include an inner perimeter portion 58 that extends from the lower portion 52 of the door sash 14 to the top portion 20 of the door sash 14. The inner perimeter portion 58 can include a front surface 60 that faces the front portion 18 of the door sash 14 and an inner surface 62 that faces the interior of the vehicle.

The outer panel portion 54 can include a flange 64 and the inner panel portion 56 can include a flange 66. The flanges 64, 66 can be connected together in any appropriate manner, such as but not limited to welding, adhesive bonding, mechanical fasteners, or any combination thereof.

Referring to FIGS. 2 and 3, the door assembly 10 can include a rear sash garnish assembly 68, a door lining 70 and a sunshade assembly 72. The rear sash garnish assembly 68 can cover the inner panel portion 56 and the outer panel portion 54. The door lining 70 can cover at least a portion of the inner door panel 46. The sunshade assembly 72 can be supported within the door lining 70 by the door lining 70, or the inner door panel 46, or both.

II. Rear Sash Garnish Assembly

Referring to FIGS. 1-7, the rear sash garnish assembly 68 can cover the outer panel portion 54 and the inner panel portion 56. Referring to FIGS. 2, 3, 6 and 7, the rear sash garnish assembly 68 can include an inner garnish 74 and an outer garnish 76. The inner garnish 74 and the outer garnish 76 can be configured with an aesthetically pleasing appearance. The garnishes 74, 76 can be formed from any appropriate material such as but not limited to plastic, carbon fiber, metal, or a combination thereof. The garnishes 74, 76 can be formed by any appropriate process, such as but not limited to injection molding, stamping, extruding, machining, or any combination thereof.

Figure 6:
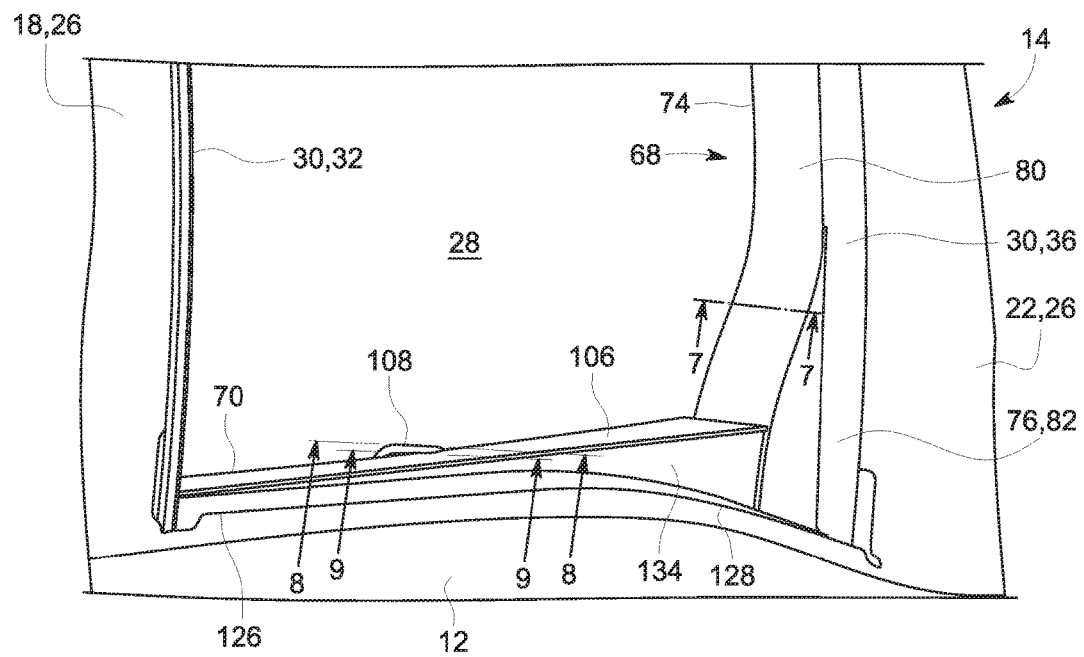
FIG. 6 is a perspective view of the rear portion of the door assembly of FIG. 1.

Referring to FIGS. 3, 6 and 7, the inner garnish 74 can extend along the inner perimeter portion 58 of the inner door panel 46. The inner garnish 74 can extend from the door lining 70 to the top portion of the door sash 14. The inner garnish 74 can cover the inner side of rear portion 36 of the run channel 30. The inner garnish 74 can extend across the inner panel portion 56 and the flange 64 of the outer panel portion 54.

Referring to FIGS. 3 and 7, the inner garish 74 can include a first wall 78 and a second wall 80. The first wall 78 can be integrally formed with the second wall 80. The first wall 78 can extend substantially perpendicular to the second wall 80 to form a substantially L-shaped cross-section.

The first wall 78 can face the interior of the vehicle. The first wall 78 can include an aesthetic outer surface facing the vehicle interior. The first wall 78 can extend from the door lining 70 to the top portion 20 of the door sash 14 in order to cover the inner panel portion 56 of the inner door panel 46 that forms the rear portion 22 of the door sash 14.

The second wall 80 can face toward the front portion 18 of the door sash 14. The second wall 80 can include an aesthetic outer surface. The second wall 80 can abut the rear portion 22 of the door sash 14. The second wall 80 can abut the upper edge 24 of the lower portion of the door assembly 10. The second wall 80 can be generally triangular in shape. The second wall 80 can extend across a corner formed by junction of the upper edge 24 and the rear portion 22. The second panel 80 can extend across the area of the outer panel portion 54. The second wall 80 can extend across the flanges 64, 66.

The outer garnish 76 can include a first wall 82 and a second wall 84. The first wall 82 can be integrally formed with the second wall 84. The first wall 82 can extend substantially perpendicular to the second wall 84 to form a substantially L-shaped cross-section.

The first wall 82 can face the exterior of the vehicle. The first wall 82 can include an aesthetic outer surface. The first wall 82 can extend from the upper edge 24 of the lower portion of the door assembly 10 toward the top portion 20 of the door sash 14 in order to cover the outer panel portion 54 of the outer door panel 12. The first wall 82 can be generally triangular in shape. The first wall 82 can extend across a corner formed by junction of the upper edge 24 and the rear portion 22 of the door sash 14.

Referring to FIG. 7, the second wall 84 can face toward the front portion 18 of the door sash 14. The second wall 84 can extend across the flanges 64, 66. The second wall 84 can extend between the flanges 64, 66 and the first wall 78 of the inner garnish 74.

In the exemplary embodiment of FIG. 7, the inner garnish 74 can be connected to the outer garnish 76 in any appropriate manner, such as but not limited to mechanical fasteners, friction fitting, adhesive bonding, hot or cold staking, or any combination thereof. In the exemplary embodiment of FIG. 7, the outer garnish 76 is heat staked to the inner garnish 74 and clipped to the inner garnish.

FIG. 7 shows a clip 86 that can connect the outer garnish 76 to the inner garnish 74. The clip 86 can include two resilient arms 88 that extend from a central portion 90. The arms 88 can diverge from each other as the arms 88 extend away from the central portion 90 so that the free ends of the arms 88 are spaced by a distance that is greater than the extent of the central portion 90.

The inner garnish 74 can include a projection 92 that extends from a rear surface of the second wall 80. The central portion 90 of clip 86 can be connected to the projection 92 in any appropriate manner, such as but not limited to hot or cold staking, adhesive bonding, overmolding, or a mechanical fastener. The arms 88 can straddle the projection 92. The projection 92 can be longer than the arms 88 so that the arms 88 are spaced away from the inner surface of the second wall 84.

The outer garnish 76 can include a hole 94 formed in the second wall 84. The hole 94 can be smaller than the distance between the ends of the arms 88.

The ends of the arms 88 can include recesses 96 that are dimensioned to receive the edge of second wall 84 that forms the hole 94.

As the projection 92 and the clip 86 are inserted into the hole 94, the arms 88 can eventually engage the edge of the second wall 84 that forms the hole 94. This engagement between the arms 88 and the edge of the hole 94 can deflect the arms 88 toward each other until the recesses 96 engage the edge of the second wall 84 that forms the hole 94. If the recesses 96 engage the edge of the second wall 84, then the arms 88 can hold the outer garnish 76 on the inner garnish 74. Feet 98 can be formed at the ends of the arms 88 to limit further insertion of the projection 92 and the clip 86 into the hole 94.

The rear sash garnish assembly 68 can be connected to the rear portion 22 of the door sash 14 in any appropriate manner, such as but not limited to mechanical fasteners, friction fitting, adhesive bonding, hot or cold staking, or any combination thereof.

III. Door Lining, Sunshade Assembly and Inner Weatherstrip

As shown in FIGS. 1 and 2, the upper edge 24 of the lower portion of the door assembly 10 can include a first portion 126 that extends from the front portion 18 of the door sash 14 and toward the rear portion 22 of the door sash 14 to a location that is intermediate the front portion 18 and the rear portion 22 of the door sash 14. The first portion 126 can be substantially straight.

The upper edge 24 can include a second portion 128 that extends from the intermediate location to the rear portion 22 of the door sash 14. The second portion 128 can curve downwardly as the second portion 128 extends from the intermediate location to the rear portion 22 of the door sash 14.

In contrast, a top surface 106 of the door lining 70 can extend along a substantially straight path as the top surface 106 extends from the front portion 18 of the door sash 14 to the rear portion 22 of the door sash 14. As a result, the door lining 70 can extend above the upper edge 24 in a direction from the upper edge 24 toward the top portion 20 of the door sash 14, and a portion of the door lining 70 can extend across a portion of the area of the window opening 28.

Referring to FIG. 3, the door lining 70 can cover the inner door panel 46 along the lower portion of the door assembly 10. The door lining 70 can be configured with an aesthetically pleasing appearance. The door lining 70 can be formed from any appropriate material, such as but not limited to plastic, carbon fiber, metal or any combination thereof. The door lining 70 can include one or more inserts of a different material, such as but not limited to carbon fiber, metal, plastic, wood, wood veneer, leather, artificial leather or any combination thereof. The door lining 70 can be connected to the inner door panel 46 in any appropriate manner, such as but not limited to mechanical fasteners, adhesive bonding or a combination thereof.

Referring to FIGS. 8 and 9, the sunshade assembly 72 can include a retractable sunshade 100 and a retractor assembly 102. The sunshade 100 can move between a retracted position and an extended position. The sunshade 100 can extend across at least a substantial portion of the window opening 28 when the sunshade 100 is in the extended position. The sunshade 100 can be coiled onto the retractor assembly 102 when the sunshade 100 is in the retracted position. FIG. 1 shows the sunshade 100 in the extended position. FIGS. 2-6, 8 and 9 show the sunshade 100 in the retracted position. The retractor assembly 102 can be biased to coil the sunshade 100 onto the retractor assembly 102. The sunshade assembly 72 can be connected to the door lining 70 as will be discussed in detail below.

Referring to FIGS. 4, 5, 8 and 9, an opening 104 can be formed between the door lining 70 and the sunshade assembly 72 that extends along the top surface 106 of each. The sunshade 100 can extend through the opening 104 when the sunshade 100 extends from the retractor assembly 102.

Referring to FIGS. 3, 6, 8 and 9, the sunshade assembly 72 can include a pull tab (or handle) 108. Referring to FIGS. 8 and 9, the sunshade assembly 72 can include first and second clamp members 110, 112 and a shaft 114. The handle or pull tab 108, first and second clamp members 110, 112 and the shaft 114 can be formed from any appropriate material, such as but not limited to a plastic, metal or composite material.

As shown in FIGS. 8 and 9, the first and second clamp members 110, 112 can be clamped onto the free end of the sunshade 100. As shown in FIG. 8, the first and second clamp members 110, 112 can include first and second recesses 116, 118, respectively. The second clamp member 112 can include the shaft 114. The shaft 114 can extend within the second recess 118 of the second clamp member 112. The recesses 116, 118 can be dimensioned to receive a portion of the pull tab 108, and can accommodate the portion of the pull tab 108 so that the pull tab 108 can pivot through a predetermined angular range about the shaft 114. In the exemplary embodiment of FIG. 8, the shaft 114 can be integrally molded with the second clamp member 112. However, exemplary embodiments are intended to include a shaft 114 that is formed separately from the second clamp member 112. Exemplary embodiments are intended to include forming the shaft 114 from a first material and overmolding the second member 112 onto the shaft 114 using a second material that is different from the first material.

Referring to FIGS. 8 and 9, the first clamp member 110 can include a groove 120, and the second clamp member 112 can include a tongue 122. The groove 120 can extend along the length of the first clamp member 110. The tongue 122 can extend along the length of the second clamp member 112. The tongue 122 and the groove 120 can be configured for mating engagement therebetween. The tongue 122 and the groove 120 can be dimensioned, such that when the sunshade 100 is clamped between the first and second clamp members 110, 112, and the sunshade 100 extends along the tongue 122 and the groove 120. An interference fit is formed between the sunshade 100 and the tongue 122 and the groove 120 so that the clamp members 110, 112 firmly clamp the sunshade 100 therebetween.

Referring to FIGS. 2, 4-6, 8 and 9, the door assembly 10 can include an inner weatherstrip 124 that extends along the upper edge 24 of the lower portion of the door assembly 10. The inner weatherstrip 124 can follow the contour of the upper edge 24 of the inner portion of the door assembly 10, such that the door lining 70 can extend above the inner weatherstrip 124 in a direction from the upper edge 24 toward the top portion 20 of the door sash 14. The inner weatherstrip 124 can engage the interior surface of the windowpane 16.

The door assembly 10 can include an outer weather strip that extends along outer door panel 12 and along the upper edge 24. The outer weatherstrip can engage the exterior surface of the windowpane 16. The inner and outer weatherstrips can impede or prevent at least a portion of the debris and liquid(s) on the windowpane 16 from entering the closed cavity 48 formed by the outer and inner door panels 12, 46. The outer weatherstrip has been omitted for simplicity and clarity of the drawings.

As shown in FIGS. 8 and 9, the inner weatherstrip 124 can include a seal member 130, a mounting member 132 and a weatherstrip garnish 134. The seal member 130 and the mounting member 132 can be formed from any appropriate flexible material, such as but not limited to rubbers, plastics or composites thereof. The mounting member 132 can include a metal reinforcement member over which a plastic material and/or a rubber material is molded or vulcanized.

The seal member 130 and the mounting member 132 can be integrally formed as a single piece. However, exemplary embodiments are intended to cover the seal member 130 and mounting member 132 being separately formed and later connected together in any appropriate manner.

The seal member 130 can include an upper wiper seal 136 and a lower wiper seal 138 that are cantilevered to the mounting member 132. The wiper seals 136, 138 can engage the windowpane 16 as the windowpane 16 is actuated between the closed and opened positions. The wiper seals 136, 138 can have a substantially V-shaped cross-section, with the base of the "V" connected to the mounting member 132.

The mounting member 132 can include a substantially U-shaped main body 140, a plurality of internal protrusions 142 and a flange seal 144. The main body 140 can define a cavity. The internal protrusions 142 can extend into the cavity of the main body 140. The internal protrusions 142 can be configured with an appropriate elasticity and length into the cavity of the main body 140 so that the internal protrusions 142 frictionally engage each side of the inner door panel 46. The flexure and frictional engagement by the internal protrusions 142 can resist displacement of the mounting member 132 off of the inner door panel 46.

The main body 140 of the mounting member 132 can include an outer side to which the wiper seals 136, 138 are mounted. The main body 140 can include an inner side to which a first locking tab 150 is mounted. A base portion of the main body 140 can connect the inner and outer sides in order to form the substantially U-shaped cross-section.

The flange seal 144 can extend from the main body 140 of the mounting member 132 and toward the weatherstrip garnish 134. The flange seal 144 can be cantilevered to the main body 140. The flange seal 144 can be connected to the main body 140 at the junction of the outer side and the base of the main body 140. The flange seal 144 can extend along and engage the exterior surface of the weatherstrip garnish 134. The flange seal 144 can be configured with an arcuate or bent cross-sectional shape that is at least partially straightened (or unbent) by the engagement with the weatherstrip garish 134 so that the flange seal 144 is biased into engagement with the exterior surface of the weatherstrip garnish 134.

The weatherstrip garnish 134 can include an exterior wall 146 and an interior wall 148. The exterior wall 146 can extend from the second portion 128 of the upper edge 24 of the door assembly 10 toward the top portion 20 of the door sash 14. The exterior wall 146 can extend along the second portion 128 in a direction from the rear portion 22 of the door sash 14 toward the front portion 18 of the door sash 14. The exterior wall can extend to the rear sash garnish assembly 68. In particular, the exterior wall 146 can extend to the outer garnish 76. The exterior wall 146 can abut or be spaced by a tolerance gap from the outer garnish 76. As shown in FIG. 1 and inferred from FIGS. 2 and 4-6, the exterior wall 146 can include an exterior surface that faces the windowpane 16 if the windowpane 16 is in the closed position or in a partially opened position. Returning to FIGS. 8 and 9, the flange seal 144 can engage the exterior surface of the exterior wall 146. The interior wall 148 can extend from the exterior wall 146 and toward the door lining 70 and the sunshade assembly 72. The exterior wall 146, the door lining 70 and the sunshade assembly 72 can cover or shield the interior wall 148 from view from the perspectives of outside and inside the vehicle. As will be discussed in further detail below, the weatherstrip garnish 134 can be connected to the sunshade assembly 72 and to the inner weatherstrip 124.

A. Connection Between Sunshade Assembly and Inner Weatherstrip

Referring to FIG. 8, the weatherstrip garnish 134 can be connected to the sunshade assembly 72. The connection between the weatherstrip garnish 134 and the sunshade assembly 72 can facilitate the assembly process for securing the door lining 70, sunshade assembly 72, weatherstrip garnish 134, and inner weatherstrip 124 to the inner door panel 46 and to each other.

The sunshade assembly 72 can include a sunshade garnish 166 and a housing 168. The sunshade garnish 166 can complete the top surface 106 in combination with the door lining 70. The sunshade garnish 166 can include an inner edge that is spaced from an adjacent edge of the door lining 70 in order to form the opening 104. The housing 168 can rotatably support the retractor assembly 102 between the door lining 70 and the inner door panel 46. The housing 168 can contain the amount of the sunshade 100 retracted by the retractor assembly 102. As will be discussed in detail below, a fastener assembly can connect the sunshade garnish 166 to each of the weatherstrip garnish 134 and the housing 168.

The weatherstrip garnish 134 can include a hole, a collar 170 and a tab 172. As will be discussed in further detail, the hole can permit the weatherstrip garnish 134 to be connected to the sunshade garnish 166 and the housing 168.

The hole can extend through the interior wall 148 adjacent to the tab 172. The collar 170 can surround the hole, and can abut the tab 172. The tab 172 can extend away from the interior wall 148. The tab 172 can extend away from the interior wall 148 in a direction that is substantially opposite to the direction in which the exterior wall 146 extends away from the interior wall 148. The tab 172 can extend from an side of the interior wall 148 that is opposite to the side along which the exterior wall 146 extends.

The sunshade garnish 166 can include a top wall 174, a channel wall 176 and a connection boss 178. As will be discussed in further detail, the connection boss 178 can permit the sunshade garnish 166 to be connected to each of the weatherstrip garnish 134 and the housing 168.

The top wall 174 can include a top surface that forms a portion of the top surface 106 along with the door lining 70. An outer edge of the top wall 174 can be aligned with and can abut the exterior wall 146.

The channel wall 176 can extend away from the top wall 174 along an inner edge that is opposite to the outer edge of the top wall 174. The channel wall 176 can extend from the top wall 174 toward the housing 168. The channel wall 176 can extend substantially perpendicular to the top wall 174.

The connection boss 178 can include an extension member 180, a base 182 and a threaded collar 184.

The extension member 180 can extend away from an inner surface of the top wall 174, and toward the interior wall 148 of the weatherstrip garnish 134. The extension member 180 can space the base 182 away from the inner surface of the top wall 174.

The base 182 can span the extension member 180. The base 182 can be positioned between the extension member 180 and the threaded collar 184.

The threaded collar 184 can extend from the base 182, and toward the weatherstrip garnish 134. At least a portion of the threaded collar 184 can extend into the hole formed in the weatherstrip garnish 134. The threaded collar 184 can be substantially cylindrical, and can be annular. The inner surface of the threaded collar 184 can include threads.

The housing 168 can include a storage portion 186, a guide portion 188 and a fastener tab 190. The storage portion 186 and the guide portion 188 can each be hollow and in communication with each other so that the sunshade 100 can be retracted or extended from the retractor assembly 102. As will be discussed in further detail, the fastener tab 190 can permit the housing 168 to be connected to each of the weatherstrip garnish 134 and the sunshade garnish 166.

The storage portion 186 can house a roller of the retractor assembly 102. The storage portion can be sized to accommodate a retracted length of the sunshade 100. The storage portion 186 can be hollow and can be a substantially circular cylinder.

The guide portion 188 can be configured to guide the sunshade 100 into and out of the storage portion 186. The guide portion 188 can include an inner opening that can be in communication with an opening in the storage portion 186. The guide portion 188 can include an outer opening through which an extended length of the sunshade 100 can pass. The outer opening of the guide portion 188 can be in communication with the opening 104 formed in the top surface 106. The guide portion 188 can be sized to accommodate the sunshade 100 as the sunshade 100 is extended and retracted. The guide portion 188 can be hollow and can be a substantially rectangular cylinder.

The fastener tab 190 can extend away from the guide portion 188. The fastener tab 190 can be adjacent to the outer opening of the guide portion 188. The fastener tab 190 can extend toward the connection boss 178 of the sunshade garnish 166, and toward the exterior wall 146 of the weatherstrip garnish 134. The fastener tab 190 can include a hole that is aligned with the hole in the weatherstrip garnish 134 and the inner surface of the threaded collar 184. The fastener tab 190 can extend along and between the interior wall 148 of the weatherstrip garnish 134 and the base 182 of the connection boss 178. The threaded collar 184 can pass through the hole in the fastener tab 190. Thus, the threaded collar 184 can restrict relative movement between the housing 168, the weatherstrip garnish 134 and the sunshade garnish 166 in any direction non-parallel to the axis of the threaded collar 184.

A threaded fastener 192, such as but not limited to a screw or a bolt, can be threaded onto the threaded collar 184. The fastener tab 192 can be sandwiched between the base 182 and the interior wall 148. Thus, the housing 168, the weatherstrip garnish 134 and the sunshade garnish 166 can be secured together.

B. Connection Between Weatherstrip Garnish and Inner Weatherstrip

The inner weatherstrip 124 and the weatherstrip garnish 134 can be connected together to facilitate the assembly of the inner weatherstrip 124 and the weatherstrip garnish 134 to the inner door panel 46, to enhance the aesthetic appearance of the inner weatherstrip 124 and the weatherstrip garnish 134, and to reduce, minimize or prevent the intrusion of liquid and/or debris into the space between the inner door panel 46 and the door lining 70.

Referring to FIG. 9, the mounting member 132 can include the first locking tab 150. The first locking tab 150 can extend from the inner side of the main body 140 and toward the door lining 70. The first locking tab 150 can be cantilevered from the main body 140.

The first locking tab 150 can include a bead 152 formed at the free end of the first locking tab 150. The bead 152 can include a cam surface 154 and a first lock surface 156.

The cam surface 154 can extend inwardly from the outer edge of the first locking tab 150 and toward the weatherstrip garnish 134. The cam surface 154 can be inclined so that the cam surface 154 rises as the cam surface 154 extends inwardly of the first locking tab 150. The cam surface can be formed by an arcuate surface portion and a planar inclined surface portion. However, exemplary embodiments are intended to include any geometric configuration of the bead 152 that can provide the cooperation between the first locking tab 150 and a second locking tab 158 of the weatherstrip garnish 134 to be discussed below.

The first lock surface 156 can extend from the cam surface 154 and toward the main portion of the first locking tab 150. The first lock surface 156 can extend from the cam surface 154 at an angle. The first lock surface 156 can extend away from the main portion of the first locking tab 150 at an angle. The first lock surface 156 can be substantially planar.

The weatherstrip garnish 134 can include a second locking tab 158 that can be configured to engage the first locking tab 150 of the inner weatherstrip 124 in order to connect the weatherstrip garnish 134 to the inner weatherstrip 124, as will be discussed in further detail below. The second locking tab 158 can extend from the interior wall 148 and toward the mounting member 132. The second locking tab 158 can extend from the interior wall 148 along side of the interior wall 148 that is opposite to the side along which the exterior wall 146 extends. The second locking tab 158 can include a cantilevered portion that can extend substantially parallel to the interior wall 148. The second locking tab 158 can be cantilevered from a side of the interior wall 148.

The second locking tab 158 can include a ramped projection 160 formed at the free end of the first locking tab 150. The projection 160 can include an inclined surface 162 and a second lock surface 164.

The inclined surface 162 can extend inwardly from the outer edge of the second locking tab 158 and toward the door lining 70. The inclined surface 162 can be inclined from the free end of the second locking tab 158 toward the second lock surface 164.

The second lock surface 164 can extend from the inclined surface 162 and back toward the main portion of the second locking tab 158. The second lock surface 164 can extend from the inclined surface 162 at an angle. The second lock surface 164 can extend away from the main portion of the second locking tab 158 at an angle. The second lock surface 164 can be substantially planar.

As the door lining 70 approaches the inner door panel 46 during assembly of the door lining 70 and the sunshade assembly 72 to the inner door panel 46 in the direction of arrow A, the projection 160 of the second locking tab 158 abuts the cam surface 154 of the first locking tab 150. The inclined surface 162 can follow along the cam surface 154 until the second lock surface 164 passes the first lock surface 156.

One or both of the first and second locking tabs 150, 158 can be configured so that the one or both of the tabs 150, 158 can resiliently deflect away from the other of the tabs 150, 158 when the inclined surface 162 engages the cam surface 154, and then resiliently return to the original orientation when the second lock surface 164 passes the first lock surface 156. As a result, the second lock surface 164 can engage the first locking surface 156, thereby connecting the weatherstrip garnish 134 to the inner weatherstrip 124.

The locking engagement provided by the locking tabs 150, 158 can limit or prevent relative separation of the weatherstrip garnish 134 (which is firmly secured to the door lining 70) from the inner weatherstrip 124 (which is firmly secured to the inner door panel 70). This can limit or prevent an undesirable gap from forming between the weatherstrip garnish 134 and the flange seal 144 of the inner weatherstrip 124. As a result, the aesthetic appearance between the weatherstrip garnish 134 and the inner weatherstrip 124 can be enhanced. Further, the seal formed between the flange seal 144 and the weatherstrip garnish 134 can be maintained so that liquid and/or debris wiped from the windowpane 16 by the upper and lower wiper seals 136, 138 can be limited or prevented from entering the space between the inner door panel 46 and the door lining 70.

IV. Alternative Embodiments

While certain embodiments of the invention are described above, and FIGS. 1-9 disclose the best mode for practicing the various inventive aspects, it should be understood that the invention can be embodied and configured in many different ways without departing from the spirit and scope of the invention.

Figure 10:
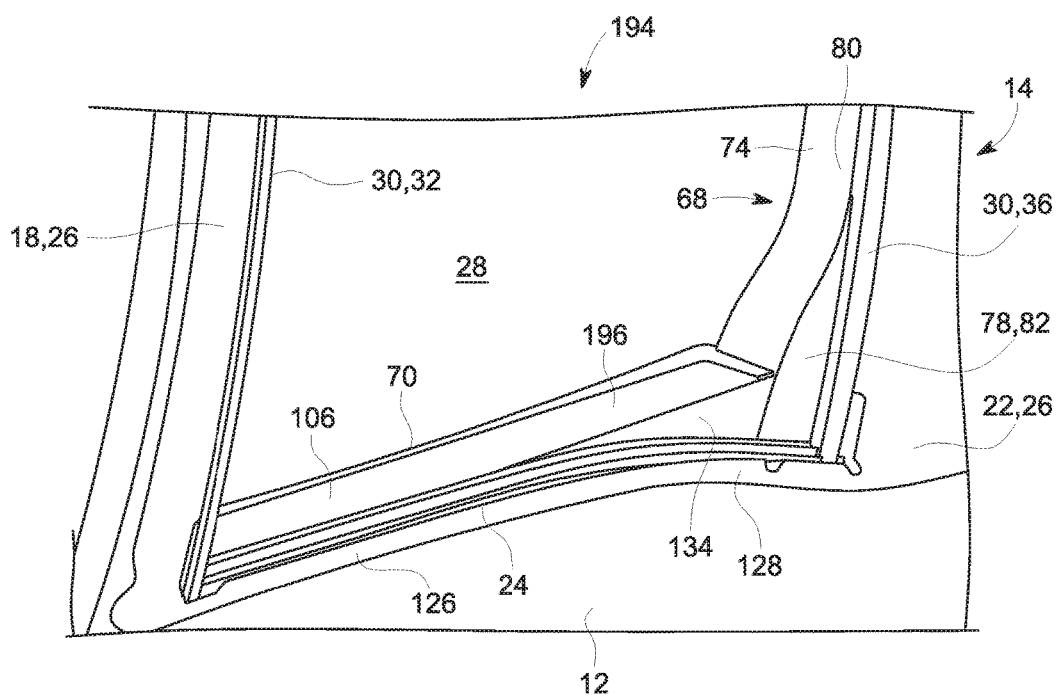
FIG. 10 is a perspective view of an alternate embodiment of the door assembly of FIG. 1.

For example, embodiments are disclosed above in the context of door assembly 10 that includes a sunshade assembly 72 as shown in FIGS. 1-9. However, embodiments are intended to include or otherwise cover any type of door assembly disclosed above. For example, FIG. 10 illustrates a door assembly 194 from which a sunshade assembly is omitted. However, the door assembly 194 can include other features of the embodiment of FIGS. 1-9. In FIG. 10, same or similar structures are identified with the same reference numerals used in FIGS. 1-9. In place of the sunshade garnish 166, the door assembly 194 can include an insert garnish 196. The insert garnish 196 can be configured to abut the door lining 70 so as to close the space occupied by the sunshade garnish 166, and to close the opening 104 formed between the door lining 70 and the sunshade garnish 166 of the door assembly 10 of FIGS. 1-9. The insert garnish 196 can include the second locking tab 158 and the connection boss 178 as provided on the sunshade garnish 166. In this way, the door lining 70, the weatherstrip garnish 134 and the inner weatherstrip 124 can be common to any door assembly, regardless of whether a sunshade assembly is included or not. Thus, assembly complexity, time and cost can be reduced.

In another alternate embodiment, the door assembly can be located at any position on the side of the vehicle, such as a front door a rear door, or at a rear end of the vehicle. However, the above alternative embodiments are merely provided for exemplary purposes, and as indicated above, embodiments are intended to cover any type of door assembly disclosed above.

While the subject matter has been described in detail with reference to exemplary embodiments thereof, it will be apparent to one skilled in the art that various changes can be made, and equivalents employed, without departing from the scope of the invention. All related art references discussed in the above Description of the Related Art section are hereby incorporated by reference in their entirety.

What is claimed is:

1. A weatherstrip and garnish assembly for a vehicle door that includes a body flange, the weatherstrip and garnish assembly comprising:
    a weatherstrip assembly that includes a weatherstrip configured to be secured to the body flange of the vehicle door when the weatherstrip is mounted on the vehicle door, the weatherstrip including a curved portion;
    a sunshade garnish that is spaced from the curved portion of the weatherstrip to define a gap therebetween;
    a weatherstrip garnish that is disposed between the sunshade garnish and the weatherstrip so as to cover the gap, the weatherstrip garnish includes an exterior wall, and the curved portion of the weatherstrip abuts the exterior wall and extends on the exterior wall such that the curved portion of the weatherstrip curves on the exterior wall in a direction away from the sunshade garnish;
    a first connector that connects the sunshade garnish to the weatherstrip garnish; and
    a second connector that connects the weatherstrip garnish to the weatherstrip assembly, the second connector is spaced away from the exterior wall.

2. The weatherstrip and garnish assembly according to claim 1, wherein the weatherstrip assembly includes a mounting member, a seal member, and a flange seal, the mounting member being connected to the body flange, and the flange seal engaging the weatherstrip garnish.

3. The weatherstrip and garnish assembly according to claim 1, wherein the second connector includes a first locking tab connected to the weatherstrip garnish, and a second locking tab connected to the weatherstrip assembly and engaging the first locking tab.

4. The weatherstrip and garnish assembly according to claim 1, further comprising a sunshade, a retractor assembly, and a housing, the retractor assembly being mounted in the housing, and the sunshade being extendible and retractable relative to the housing.

5. The weatherstrip and garnish assembly according to claim 4, wherein the first connector connects the housing to at least one of the sunshade garnish and the weatherstrip garnish.

6. The weatherstrip and garnish assembly according to claim 1, wherein the first connector includes a connection boss connected to the sunshade garnish.

7. The weatherstrip and garnish assembly according to claim 6, wherein the first connector includes a hole defined through the weatherstrip garnish, and the connection boss extends within the hole.

8. The weatherstrip and garnish assembly according to claim 7, wherein the first connector includes a collar formed adjacent the hole.

9. The weatherstrip and garnish assembly according to claim 7, wherein the connection boss includes an extension member, a base, and a threaded collar, and the first connector includes a threaded fastener that is connected to the threaded collar.

10. The weatherstrip and garnish assembly according to claim 9, wherein the connection boss is unitarily formed with the sunshade garnish.

11. A vehicle door, comprising:
    an inner door panel having a body flange;
    an outer door panel connected to the inner door panel; and
    a weatherstrip and garnish assembly that includes:
        a weatherstrip assembly that includes a weatherstrip secured to the body flange of the vehicle door, the weatherstrip including a curved portion;
        a sunshade garnish that is spaced from the curved portion of the weatherstrip to define a gap therebetween;
        a weatherstrip garnish that is disposed between the sunshade garnish and the weatherstrip so as to cover the gap, the weatherstrip garnish includes an exterior wall, and the curved portion of the weatherstrip abuts the exterior wall and extends on the exterior wall such that the curved portion of the weatherstrip curves on the exterior wall in a direction away from the sunshade garnish;

a first connector that connects the sunshade garnish to the weatherstrip garnish; and a second connector that connects the weatherstrip garnish to the weatherstrip assembly, the second connector is spaced away from the exterior wall.

12. The vehicle door according to claim 11, wherein the weatherstrip assembly includes a mounting member, a seal member, and a flange seal, the mounting member being connected to the body flange, and the flange seal engaging the weatherstrip garnish; and wherein the second connector includes a first locking tab connected to the weatherstrip garnish, and a second locking tab connected to the weatherstrip assembly and engaging the first locking tab.

13. A method of manufacturing a weatherstrip and garnish assembly for use with a vehicle door that includes a body flange, the method comprising:

configuring a weatherstrip assembly to include a weatherstrip that defines a curved portion;

securing the weatherstrip to the body flange of the vehicle door;

spacing a sunshade garnish from the curved portion of the weatherstrip to define a gap therebetween;

configuring a weatherstrip garnish to include an exterior wall;

disposing the weatherstrip garnish between the sunshade garnish and the weatherstrip so as to cover the gap;

disposing the weatherstrip on the weatherstrip garnish such that the curved portion of the weatherstrip assembly abuts the exterior wall and extends on the exterior wall such that the curved portion of the weatherstrip assembly curves on the exterior wall in a direction away from the sunshade garnish;

connecting the sunshade garnish to the weatherstrip garnish with a first connector; and connecting the weatherstrip garnish to the weatherstrip assembly with a second connector that is spaced away from the exterior wall.

14. The vehicle door according to claim 11, further comprising a sunshade, a retractor assembly, and a housing, the retractor assembly being mounted in the housing, and the sunshade being extendible and retractable relative to the housing.

15. The vehicle door according to claim 14, wherein the first connector connects the housing to at least one of the sunshade garnish and the weatherstrip garnish.

16. The vehicle door according to claim 11, wherein the first connector includes a connection boss connected to the sunshade garnish.

17. The vehicle door according to claim 16, wherein the first connector includes a hole defined through the weatherstrip garnish, and the connection boss extends within the hole.

18. The vehicle door according to claim 17, wherein the first connector includes a collar formed adjacent the hole.

19. The vehicle door according to claim 17, wherein the connection boss includes an extension member, a base, and a threaded collar, and the first connector includes a threaded fastener that is connected to the threaded collar.

20. The vehicle door according to claim 19, wherein the connection boss is unitarily formed with the sunshade garnish.

* * * * *